(12) United States Patent
Fujino

(10) Patent No.: US 7,130,096 B2
(45) Date of Patent: Oct. 31, 2006

(54) LIGHT BEAM SCANNING DEVICE AND IMAGE FORMING APPARATUS

(75) Inventor: Hitoshi Fujino, Kasugai (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 64 days.

(21) Appl. No.: 11/055,513

(22) Filed: Feb. 11, 2005

(65) Prior Publication Data

US 2005/0179975 A1 Aug. 18, 2005

(30) Foreign Application Priority Data

Feb. 17, 2004 (JP) ............................. 2004-040388

(51) Int. Cl.
 G02B 26/08 (2006.01)
 B41J 27/00 (2006.01)
(52) U.S. Cl. ....................... 359/216; 347/261
(58) Field of Classification Search ............. None
 See application file for complete search history.

(56) References Cited

U.S. PATENT DOCUMENTS

| 4,993,792 A | 2/1991 | Minoura |
| 5,191,463 A | 3/1993 | Minoura |
| 2002/0196514 A1* | 12/2002 | Atsuumi et al. ............ 359/212 |

FOREIGN PATENT DOCUMENTS

JP  B2 03-005562  1/1991

* cited by examiner

*Primary Examiner*—James Phan
(74) *Attorney, Agent, or Firm*—Oliff & Berridge, PLC

(57) ABSTRACT

An effective scanning range of laser light in a scanning direction is configured so that a center position of the effective scanning range is displaced by a distance $\beta$ along the scanning direction from an optical axis f an f$\theta$ lens. The incidence angle $\alpha$ between a center of luminous flux of the laser light on a deflection surface of polygon mirror and the optical axis of the f$\theta$ lens can beset to satisfy a relational expression $(4\pi/N)-(W/D) \leq |\alpha| < (4\pi/N) - \{(W-\beta)/D\}$.

7 Claims, 8 Drawing Sheets

LIGHT BEAM SCANNING DEVICE AND IMAGE FORMING APPARATUS

BACKGROUND OF THE INVENTION

1. Field of the Invention

The present invention relates to an image-forming apparatus and a light beam scanning apparatus.

2. Description of the Related Art

For example, a laser scanning apparatus (equivalent to a light beam scanning apparatus) provided in a laser printer as an image-forming apparatus has such a configuration as shown in FIG. 8. That is, laser light L (represented by the solid-line arrow in FIG. 8) emitted from a laser light source 1 passes through a cylindrical lens 2 so as to be incident on a deflection surface 3a of a polygon mirror 3. The laser light L reflected on the deflection surface 3a is converged by imaging optical systems 4 and 5 so that an imaging spot Ps is formed on a photosensitive drum surface 6 as an image carrier. The imaging spot Ps is scanned on the photosensitive drum surface 6 as the polygon mirror 3 rotates.

The laser light L incident on the photosensitive drum surface 6 is scattered and reflected on the photosensitive drum surface 6. The scatter-reflected light La (represented by the broken-line arrow in FIG. 8) is transmitted through the imaging optical systems 4 and 5 and returns to the polygon mirror 3 side. On this occasion, part of the scatter-reflected light La is reflected on a deflection surface (hereinafter referred to as "adjacent deflection surface 3b") adjacent to the deflection surface 3a so that the angle of reflection of the part of the scatter-reflected light La is different from that of the laser light L. The reflected light Le is transmitted through the imaging optical systems 4 and 5 so as to be incident on a point Pg on the photosensitive drum surface 6. Incidentally, the reflected light Le is always concentrated on the point Pg regardless of the angle of incidence of the laser beam L on the deflection surface 3a of the polygon mirror 3.

Accordingly, the reflected light Le act so that a ghost image different from an original electrostatic latent image is formed on the photosensitive drum surface 6. This may cause deterioration of image-forming quality.

SUMMARY OF THE INVENTION

A laser printer has recently shown a tendency to be miniaturized more greatly. For this reason, a method of shortening the distance between the imaging optical system 5 and the photosensitive drum surface 6 may be conceived. The focal length D of the imaging optical system 5 however depends on the lens characteristic of the imaging optical system 5. It is finally necessary to keep the imaging optical system 5 and the photosensitive drum surface 6 apart from each other substantially by the focal length D in order to form the imaging spot of the laser light L on the photosensitive drum surface 6.

To attain miniaturization, the distance between each of the imaging optical systems 4 and 5 and the polygon mirror 3 must be reduced for this reason. However, as the distance between each of the imaging optical systems 4 and 5 and the polygon mirror 3 decreases, the incidence angle α of the laser light L on the polygon mirror 3 cannot but increase so that the laser light L can be prevented from striking against an end of the imaging optical system 4.

On this occasion, the effective scanning range depends on the size of paper as a recording medium. Accordingly, it is impossible to change the values of W and D. There is no method but a method of reducing the number N of deflection surfaces of the polygon mirror 3 so that the angle α can be increased while the relational expression A is satisfied. Because the number of scanning times (scanning efficiency) per rotation of the polygon mirror 3 is however reduced if the number N of deflection surfaces of the polygon mirror 3 is reduced, there arises a problem that printing speed is lowered unless the polygon mirror 3 is rotated at a higher speed.

The present invention is accomplished on the basis of the aforementioned circumstances and an object of the invention is to provide a light beam scanning apparatus and an image-forming apparatus in which the incidence angle of a light beam on a rotary polygon mirror can be increased without necessity of reducing the number of deflection surfaces of the rotary polygon mirror.

To achieve the foregoing object, according to one aspect of the invention, there is provided with a light beam scanning apparatus including: a light source portion which emits a light beam; a rotary polygon mirror having a plurality of deflection surfaces, which deflects the light beam incident on the plurality of deflection surfaces by rotating on a rotation axis; and an imaging optical system which scans and images the light beam deflected by the rotary polygon mirror on a scanned surface to thereby form a latent image on the scanned surface, wherein a position which is a center of an effective scanning range of the light beam in a scanning direction and on which the latent image is formed on the scanned surface is set to be apart from an optical axis of the imaging optical system by a distance β along the scanning direction, and an angle α between a center of luminous flux of the light beam incident on the deflection surfaces of the rotary polygon mirror and an optical axis of the imaging optical system is set to satisfy a following relational expression to thereby form a ghost image on a region out of the effective scanning range $(4\pi/N)-(W/D) \leq |\alpha| < (4\pi/N) - \{(W-\beta)/D\}$ in which N is the number of deflection surfaces of the rotary polygon mirror, D is the optical length from an image-side principal point of the imaging optical system to the scanned surface, and W is a half width of the effective scanning range in the scanning direction.

According to this configuration, the effective scanning range (used for forming an image) of the light beam in the scanning direction is formed so that the center position of the effective scanning range is displaced along the scanning direction from the optical axis of the imaging optical system. Accordingly, the angle α between the center of luminous flux of the light beam toward the deflection surfaces of the rotary polygon mirror and the optical axis of the imaging optical system can be set to satisfy the relational expression $(4\pi/N)-(W/D) \leq |\alpha| < (4\pi/N) - \{(W-\beta)/D\}$. That is, while the ghost image can be removed from the effective scanning range, the incidence angle α of the light beam on the deflection surfaces of the rotary polygon mirror can be increased without reduction in the number of the deflection surfaces of the rotary polygon mirror, compared with the configuration of Patent Document 1. Because the incidence angle α can be increased, the distance between the rotary polygon mirror and the imaging optical system can be reduced so that the size of the apparatus can be reduced.

According to another aspect of the invention, the center position of the effective scanning range is displaced toward the light source portion side from the optical axis of the imaging optical system.

By thus configuration, the effective scanning range is formed so that the center position of the effective scanning range is displaced toward the light source portion side from the optical axis of the imaging optical system in the scanning direction.

According to another aspect of the invention, the distance β is set to satisfy the following relational expression $$\beta < D\gamma - W$$

in which γ is an angle between the optical axis of the imaging optical system and the center of luminous flux of the light beam passing through a position nearest to the light source portion side, in an effective region on which the imaging optical system can form an image.

By thus configuration, the width (distance β) by which the center position of the effective scanning range is displaced from the optical axis of the imaging optical system is limited to satisfy the relational expression β<Dγ−W.

According to another aspect of the invention, a shading member is provided between the imaging optical system and the scanned surface so that the light beam is shaded from an optical path of the light beam by which the ghost image is formed on a region out of the effective scanning range.

By thus configuration, if the ghost image is formed in a side portion of the effective scanning range on the scanned surface (image carrier surface) even though the ghost image can be removed from the effective scanning range, an excessive amount of toner is spent, for example, because the toner is deposited on the ghost image. Therefore, in this configuration, a shading member for shading the laser light reflected on the deflection surfaces of the rotary polygon mirror and going toward a position displaced on a side opposite to the light source portion side with respect to the effective scanning range on the scanned surface (image carrier surface) is provided to prevent the ghost image from being formed on the scanned surface (image carrier surface).

According to another aspect of the invention, a detection member is provided for receiving the light beam reflected on the deflection surfaces of the rotary polygon mirror and correcting the timing of emitting the light beam from the light source portion on the basis of the timing of light reception; and an optical path of the light beam received by the detection member is disposed between the optical path of the light beam from the light source portion and the imaging optical system.

As the detection member used for receiving the laser light deflected with the rotation of the rotary polygon mirror in a predetermined position and correcting the timing of emitting the light beam from the light source portion on the basis of the timing of light reception, for example, the light beam reflected on the deflection surfaces of the rotary polygon mirror and passing through the light source portion-side end portion of the imaging optical system is received. In this configuration, there however arises a problem that the effective scanning range is narrowed by the optical path of the laser light used by the detection member.

On the contrary, by thus configuration, the incidence angle α is set to be so large that a space can be kept to a certain degree between the light source portion and the imaging optical system. The detection member is configured so that part of the light beam reflected on the deflection surfaces of the rotary polygon mirror and displaced toward the light source portion side with respect to the imaging optical system is received. Accordingly, the effective scanning range on the scanned surface (image carrier surface) sufficiently using the effective region of the imaging optical system can be kept wide. In addition, reduction in size of the imaging optical system can be attained.

According to another aspect of the invention, the center position of the effective scanning range is displaced toward the light source portion side from the optical axis of the imaging optical system; a detection member is provided for receiving the light beam reflected on the deflection surfaces of the rotary polygon mirror and correcting the timing of emitting the light beam from the light source portion on the basis of the timing of light reception; and an optical path of the light beam received by the detection member is provided as an optical path of the light beam going toward a region displaced on a side opposite to the light source portion with respect to the effective scanning range.

According to this configuration, the effective scanning range is set so that the center position of the effective scanning range is displaced toward the light source portion side from the optical axis of the imaging optical system in the scanning direction. Accordingly, a space from an end portion of the scanned surface (image carrier surface) on a side opposite to the light source portion to the effective scanning range can be kept. Therefore, the detection member is configured so that part of the laser light reflected on the deflection surfaces of the rotary polygon mirror and displaced toward a side opposite to the laser light source portion side with respect to the effective scanning range is received. Consequently, the laser light which could not be used for forming an image can be used effectively.

According to another aspect of the invention, there is provided with an image forming apparatus including: the light beam scanning apparatus; an image carrier having the scanned surface on which the latent image is formed on the basis of the light beam given from the light beam scanning apparatus; a developing member for depositing a developing agent on the image carrier having the latent image thereon; and a transfer member for transferring the developing agent deposited on the image carrier by the developing member, onto a recording medium to thereby form an image.

Incidentally, the concept "image carrier" used in the invention includes a photosensitive belt as well as a photosensitive drum.

According to this configuration, the effective scanning range (used for forming an image) of the light beam in the scanning direction is formed so that the center position of the effective scanning range is displaced along the scanning direction from the optical axis of the imaging optical system. Accordingly, the angle α between the center of luminous flux of the light beam toward the deflection surfaces of the rotary polygon mirror and the optical axis of the imaging optical system can be set to satisfy the relational expression $(4\pi/N)-(W/D) \leq |\alpha| < (4\pi/N)-\{(W-\beta)/D\}$. That is, while the ghost image can be removed from the effective scanning range, the incidence angle α of the light beam on the deflection surfaces of the rotary polygon mirror can be increased without reduction in the number of the deflection surfaces of the rotary polygon mirror, compared with the configuration of Patent Document 1. Because the incidence angle α can be increased, the distance between the rotary polygon mirror and the imaging optical system can be reduced so that the size of the apparatus can be reduced.

DESCRIPTION OF THE PREFERRED EMBODIMENTS

<Embodiment 1>

Embodiment 1 of the invention will be described with reference to FIGS. 1 to 5.

1. Overall Configuration of Laser Printer

Figure 1:
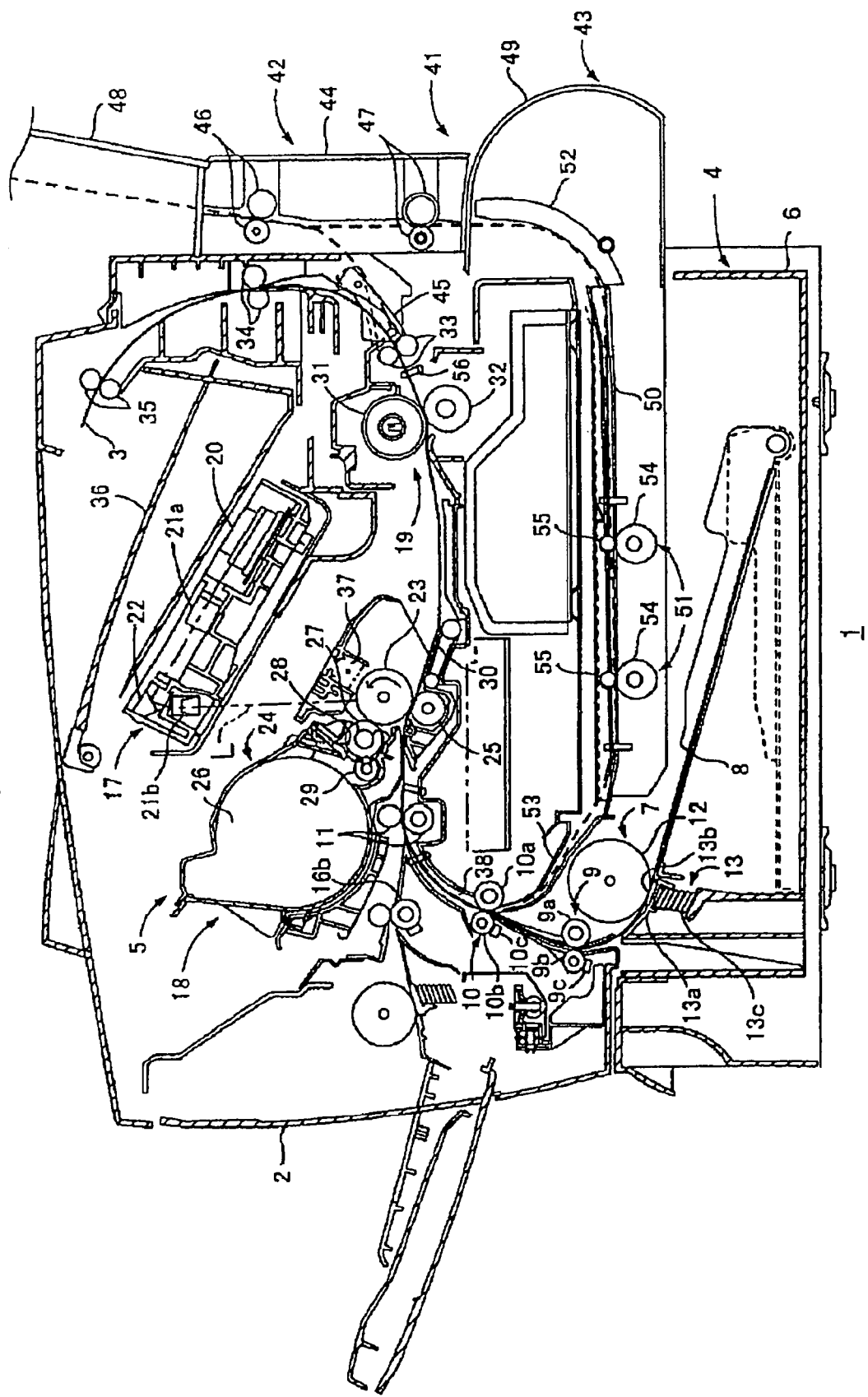
FIG. 1 is a side sectional view of important part showing the configuration of a laser printer according to Embodiment 1 of the invention.

FIG. 1 is a side sectional view of important part showing the configuration of a laser printer 1 as an image-forming apparatus according to the invention. The laser printer 1 according to this embodiment is provided for forming an image by electrophotography. The laser printer 1 has a body casing 2. A feeder portion 4 for feeding a sheet of paper 3 as a recording medium, an image-forming portion 5 for forming a predetermined image on the fed sheet of paper 3, and so on, are provided in the body casing 2.

(1) Feeder Portion

The feeder portion 4 has a paper supply tray 6 detachably attached to a bottom portion in the body casing 2, a paper supply mechanism portion 7 provided in a one-end side end portion of the paper supply tray 6, a paper pressing plate 8 provided in the paper supply tray 6, first and second conveyance portions 9 and 10 (which will be described later) provided on the downstream side of the paper supply mechanism portion 7 in the direction of conveyance of the sheet of paper 3 (the downstream or upstream side in the direction of conveyance of the sheet of paper 3 may be hereinafter referred to as "downstream or upstream side" simply), and registration rollers 11 provided on the downstream side of the first and second conveyance portions 9 and 10.

The paper supply tray 6 is shaped like a box having an upper surface opened so that sheets of paper 3 can be stored. The paper supply tray 6 is formed so that it can be detachably attached horizontally to the bottom portion of the body casing 2. The paper supply mechanism portion 7 has a paper supply roller 12, and a separation pad 13 opposite to the paper supply roller 12. The separation pad 13 has a support frame 13a, a pad member 13b, and a spring 13c.

The support frame 13a is composed of a flat plate-like member provided below the paper supply roller 12 so as to be opposite to the paper supply roller 12, and a support member formed so as to be bent substantially perpendicularly downward from a one-end side of the flat plate-like member. The support frame 13a is substantially shaped like an L shape in sectional view. A lower end portion of the support member is supported so as to be shakable. The pad member 13b is buried in a front surface of the flat plate-like member opposite to the paper supply roller 12. The spring 13c is disposed on a rear surface of the flat plate-like member. The spring 13c urges the pad member 13b to be pressed against the paper supply roller 12.

The paper pressing plate 8 is formed so that sheets of paper 3 can be stratiformly stacked in the paper supply tray 6. As the amount of the stacked sheets of paper 3 increases, the paper pressing plate 8 moves downward while an end portion farther from the paper supply mechanism portion 7 is used as a fulcrum. The paper pressing plate 8 is pressed toward the paper supply roller 12 by a spring not shown from the rear side. After a sheet of paper 3 located in the uppermost position on the paper pressing plate 8 is sandwiched between the paper supply roller 12 and the pad member 13b in accordance with the rotation of the paper supply roller 12, the sheets of paper 3 are supplied while separated one by one by the cooperation of the paper supply roller 12 and the pad member 13b.

The supplied sheet of paper 3 is delivered to the registration rollers 11 by the first and second conveyance portions 9 and 10 in a paper supply conveyance path 38 between the paper supply mechanism portion 7 and the image-forming portion 5. The first conveyance portion 9 has a first conveyance roller 9a, and a first paper dust removing roller 9b. The sheet of paper 3 is conveyed while sandwiched between the first conveyance roller 9a and the first paper dust removing roller 9b. At the same time, paper dust on the sheet of paper 3 is electrostatically adsorbed by the first paper dust removing roller 9b. The paper dust deposited on the first paper dust removing roller 9b is scraped by a first sponge member 9c. Similarly, the second conveyance portion 10 has a second conveyance roller 10a, and a second paper dust removing roller 10b. The sheet of paper 3 is conveyed while sandwiched between the second conveyance roller 10a and the second paper dust removing roller 10b. At the same time, paper dust on the sheet of paper 3 is electrostatically adsorbed by the second paper dust removing roller 10b. The paper dust deposited on the second paper dust removing roller 10b is scraped by a second sponge member 10c. The registration rollers 11 are provided as a pair of rollers for feeding the sheet of paper 3 to the image-forming portion 5 after predetermined registration.

(2) Image-Forming Portion

The image-forming portion 5 has a scanner portion 17 as a light beam scanning apparatus (scanner apparatus), a process portion 18, a fixing portion 19, and so on.

(a) Scanner Portion

The scanner portion 17 is provided in an upper portion in the body casing 2. The scanner portion 17 has a polygon mirror 20, an fθ lens 21a, a cylindrical lens 21b, a turn-back mirror 22, and soon. The configuration of the scanner portion 17 will be described later in detail. The scanner portion 17 applies laser light L onto a surface of a photosensitive drum 23 of the process portion 18 in a high-speed scanning manner.

(b) Process Portion

The process portion 18 is disposed below the scanner portion 17 and formed so as to be detachably attached to the body casing 2. The process portion 18 has a photosensitive drum 23 as a photoconductor, a developing cartridge 24, a transfer roller 25 as an example of the transfer member, and a scorotron type charger 37 as an example of charging member. The developing cartridge 24 is detachably attached to the process portion 18. The developing cartridge 24 has a toner storage portion 26, a developing roller 27 as a developing member, a layer thickness limiting blade 28, a toner supply roller 29, and so on.

The toner storage portion 26 is filled with positively chargeable non-magnetic one-component polymer toner as an example of the developing agent. The toner is supplied to the developing roller 27 by the toner supply roller 29. The toner is then carried as a thin layer having a predetermined thickness on the developing roller 27 by friction of the layer thickness limiting blade 28. On the other hand, the photosensitive drum 23 is disposed opposite to the developing roller 27 so as to be rotatable. The photosensitive drum 23 has a drum body grounded, and a drum surface constituted by a positively chargeable photosensitive layer made of polycarbonate or the like.

After the surface of the photosensitive drum 23 is uniformly positively charged by the scorotron type charger 37 with the rotation of the photosensitive drum 23 in the direction of the arrow, the surface of the photosensitive drum 23 is exposed to the laser light L given from the scanner portion 17 in a high-speed scanning manner. Thus, an electrostatic latent image based on predetermined image data is formed. When the photosensitive drum 23 is then made opposite to the developing roller 27, the toner carried on the developing roller 27 and positively charged visualizes the electrostatic latent image formed on the surface of the photosensitive drum 23. That is, the toner is supplied to a portion which is part of the uniformly positively charged surface of the photosensitive drum 23 and which has an electric potential lowered by the exposure to the laser light L. The toner is selectively carried on this portion to thereby form reversal development.

The transfer roller 25 is disposed below the photosensitive drum 23 so as to be opposite to the photosensitive drum 23. The transfer roller 25 has a roller shaft made of metal, and a roller made of an electrically conductive rubber material. The roller shaft is covered with the roller. A predetermined transfer bias is applied to the photosensitive drum 23. For this reason, the visualized image (toner image) carried on the photosensitive drum 23 is transferred onto the sheet of paper 3 while the sheet of paper 3 passes through between the photosensitive drum 23 and the transfer roller 25. The sheet of paper 3 onto which the visualized image has been transferred is conveyed to the fixing portion 19 through a conveyance belt 30.

(c) Fixing Portion

The fixing portion 19 is disposed on a side of the process portion 18, that is, on the downstream side of the process portion 18. The fixing portion 19 has a heat roller 31, a pressure roller 32 for pressing the heat roller 31, and conveyance rollers 33 provided on the downstream side of the heat and pressure rollers 31 and 32. The heat roller 31 is made of metal and has a halogen lamp for heating the toner. The toner transferred onto the sheet of paper 3 in the process portion 18 is thermally fixed while the sheet of paper 3 passes through between the heat roller 31 and the pressure roller 32. Then, the conveyance rollers 33 of the fixing portion 19 convey the sheet of paper 3 to conveyance rollers 34 and paper ejection rollers 35 provided in the body casing 2. The sheet of paper 3 conveyed by the conveyance rollers 34 is then ejected onto a paper ejection tray 36 by the paper ejection rollers 35.

In the laser printer 1, the residual toner remaining on the surface of the photosensitive drum 23 after transfer onto the sheet of paper 3 by the transfer roller 25 is collected by a so-called cleanerless developing method in which the residual toner is collected by the developing roller 27. When the residual toner is collected by such a cleanerless developing method, any special member such as a blade for removing the residual toner and any waste toner reservoir portion can be dispensed with. The configuration of the apparatus can be simplified.

(3) Configuration for Forming Double-Sided Images

Incidentally, the laser printer 1 has a re-conveyance unit 41 for forming images on opposite surfaces of the sheet of paper 3. The re-conveyance unit 41 is integrally formed but has a reverse mechanism portion 42, and a re-conveyance tray 43. The reverse mechanism portion 42 is externally attached to a rear portion side of the body casing 2. The re-conveyance tray 43 is detachably attached to the upper portion of the feeder portion 4 so as to be inserted therein.

The reverse mechanism portion 42 externally attached to the rear wall of the body casing 2 has a casing 44 substantially shaped like a rectangle in sectional view. A flapper 45, reverse rollers 46 and re-conveyance rollers 47 are provided in the casing 44. A reverse guide plate 48 is provided so as to protrude upward from an upper end portion of the casing 44. The flapper 45 is supported in the rear portion of the body casing 2 so as to be rotatable. The flapper 45 is disposed near the downstream side of the conveyance rollers 33. The flapper 45 is provided so movably that the direction of conveyance of the sheet of paper 3 having an image formed on one surface of the sheet of paper 3 and being conveyed by the conveyance rollers 33 can be selectively changed over between the direction toward the conveyance rollers 34 (the state represented by the solid line) and the following direction toward the reverse rollers 46 (the state represented by the virtual line).

The reverse rollers 46 are disposed on the downstream side of the flapper 45 and in the upper portion of the casing 44. The reverse rollers 46 are provided as a pair of rollers which are formed so that rotation can be changed over between forward and backward directions. The reverse rollers 46 first rotate in the forward direction, so that the sheet of paper 3 is conveyed toward the reverse guide plate 48. Then, the reverse rollers 46 rotate in the backward direction, so that the sheet of paper 3 is conveyed in the reverse direction. The re-conveyance rollers 47 are disposed on the downstream side of the reverse rollers 46 and substantially just below the reverse rollers 46 in the casing 44. The re-conveyance rollers 47 are provided as a pair of rollers. The sheet of paper 3 reversed by the reverse rollers 46 is conveyed to the re-conveyance tray 43 by the re-conveyance rollers 47.

When images are to be formed on opposite surfaces of the sheet of paper 3, the flapper 45 is moved so that the sheet of paper 3 goes toward the reverse rollers 46. Thus, the sheet of paper 3 having an image formed on one surface of the sheet of paper 3 is received in the reverse mechanism portion 42. The reverse rollers 46 rotate forward while the sheet of paper 3 is sandwiched between the reverse rollers 46, so that the sheet of paper 3 is conveyed outward and upward along the reverse guide plate 48. When the rear end of the sheet of paper 3 is sandwiched between the reverse rollers 46, the forward rotation of the reverse rollers 46 stops. Then, the reverse rollers 46 rotate backward so that the sheet of paper 3 with the front side back is conveyed to the re-conveyance rollers 47 so as to go substantially just downward.

Incidentally, the timing of changing the forward rotation of the reverse rollers 46 over to the backward rotation is controlled at the time when a predetermined time has passed after the rear end of the sheet of paper 3 was detected by a paper passage sensor 56 on the downstream side of the fixing portion 19. When conveyance of the sheet of paper 3 to the reverse rollers 46 is completed, the state of the flapper 45 is changed to its original state, that is, to a state in which the sheet of paper 3 from the conveyance rollers 33 is conveyed to the conveyance rollers 34.

The sheet of paper 3 conveyed to the re-conveyance rollers 47 in the reverse direction is conveyed to the following re-conveyance tray 43 by the re-conveyance rollers 47. The re-conveyance tray 43 has a paper supply portion 49 to which the sheet of paper 3 is supplied, a tray body 50, and oblique rollers 51. The paper supply portion 49 is externally attached to the rear portion of the body casing 2 on the lower side of the reverse mechanism portion 42 and has a paper guide member 52 which is curved. In the paper supply portion 49, the sheet of paper 3 from the re-conveyance rollers 47 is guided substantially to the horizontal direction by the paper guide member 52 so that the sheet of paper 3 is conveyed to the tray body 50. The tray body 50 is substantially shaped like a rectangular plate. The downstream side end portion of the tray body 50 is connected, through a re-conveyance path 53, to the middle of the paper conveyance path 38 for guiding the sheet of paper 3 to the second conveyance portion 10.

Two oblique rollers 51 are disposed in the middle of the tray body 50 in the direction of conveyance of the sheet of paper 3 so that a predetermined distance is formed between the two oblique rollers 51. The oblique rollers 51 are disposed near a reference plate (not shown) provided in the widthwise one-end portion of the tray body 50. Each oblique roller 51 has an oblique drive roller 54, and an oblique driven roller 55. The axis of the oblique drive roller 54 is disposed in a direction substantially perpendicular to the direction of conveyance of the sheet of paper 3. The oblique driven roller 55 is disposed opposite to the oblique drive roller 54 so that the sheet of paper 3 is sandwiched between the oblique drive roller 54 and the oblique driven roller 55. The axis of the oblique driven roller 55 is disposed in a direction in which the sheet of paper 3 is moved obliquely toward the reference plane.

The sheet of paper 3 conveyed from the paper supply portion 49 to the tray body 50 is conveyed toward the image-forming portion 5 again in a state in which the front surface of the sheet of paper 3 is turned over to the rear surface and the widthwise one-end edge is aligned with the reference plane by the oblique rollers 51. The rear surface of the sheet of paper 3 conveyed to the image-forming portion 5 faces and touches the photosensitive drum 23. After the visualized image is transferred, the visualized image is fixed by the fixing portion 19. Thus, the sheet of paper 3 having images on its opposite surfaces is ejected to the paper ejection tray 36.

(4) Specific Configuration of Scanner Portion

Figure 2:
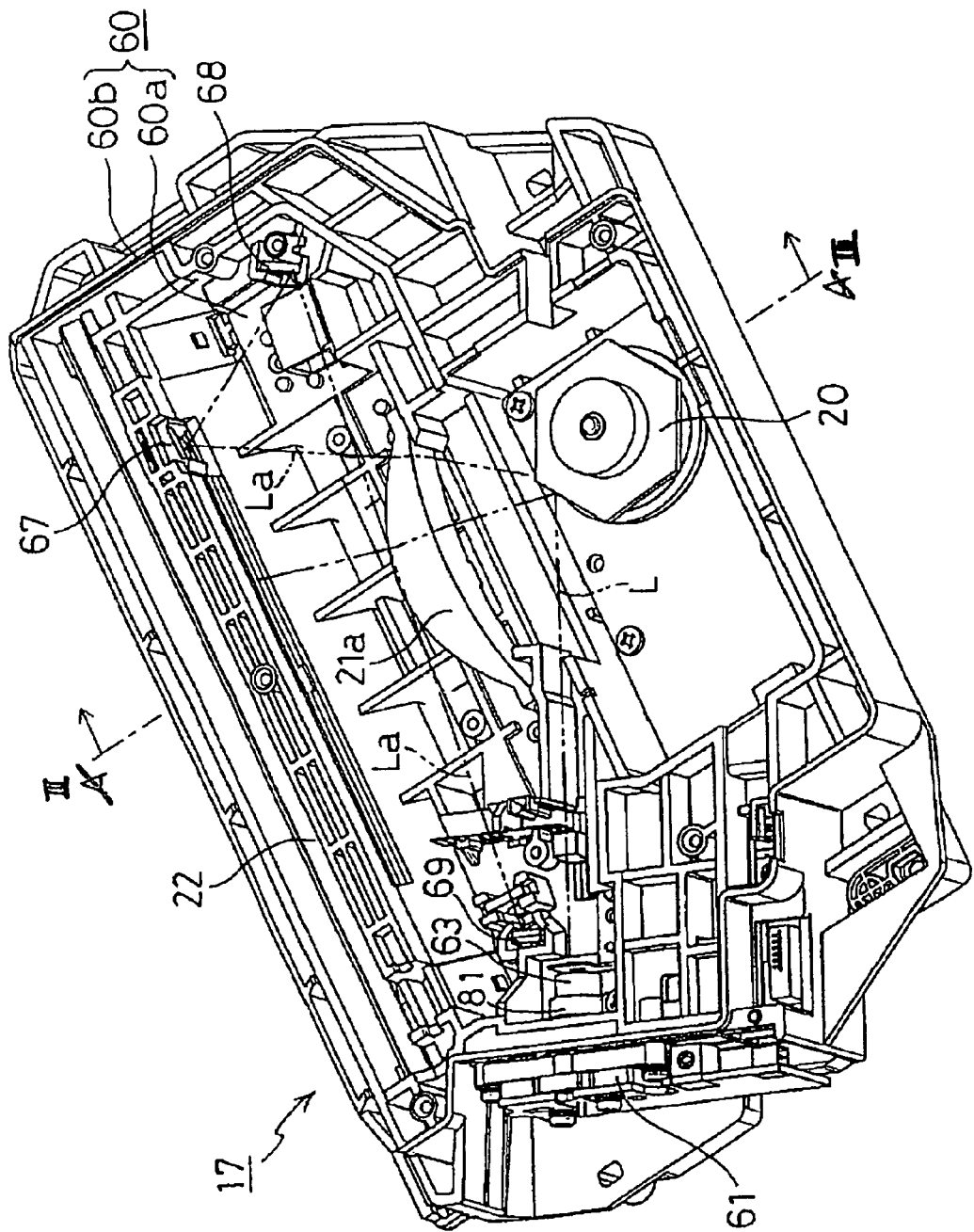
FIG. 2 is a perspective view showing the configuration of a scanner portion of the laser printer.
Figure 3:
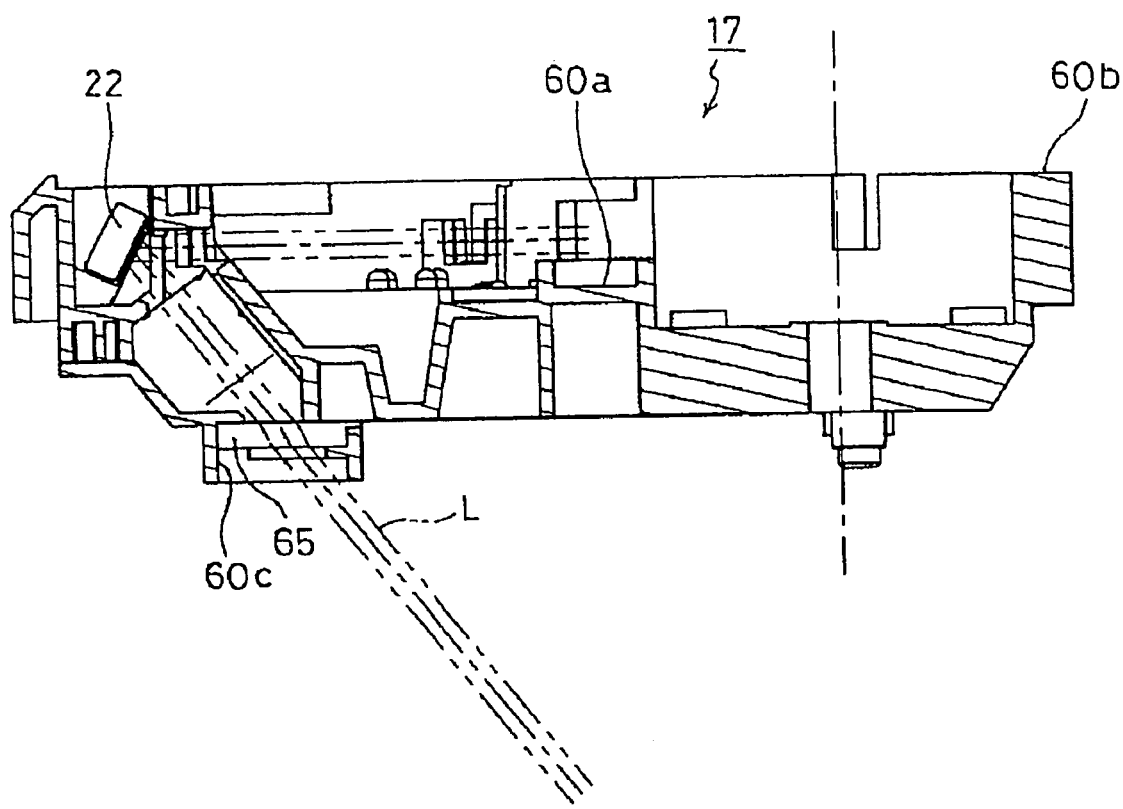
FIG. 3 is a sectional view taken along the line III—III in FIG. 2.

Next, the configuration of the scanner portion 17 will be described. FIG. 2 is a perspective view showing the configuration of the scanner portion 17. FIG. 3 is a sectional view taken along the line A—A in FIG. 2. Incidentally, the polygon mirror 20 is not shown in FIG. 3 for the sake of convenience of description but only the center line of the polygon mirror 20 is represented by the one-dot chain line in FIG. 3. The fθ lens 21a and the cylindrical lens 21b are not shown in FIG. 3 either. See FIG. 1.

As shown in FIGS. 2 and 3, the scanner portion 17 has an upward open type box-like housing 60 which has a bottom plate 60a substantially shaped like a flat plate, and a side wall 60b erected from the circumference of the bottom plate 60a. A collimator lens set 63 as an optical member for forming the optical path of the laser light L emitted from a laser light emitting portion 61 (equivalent to the light source portion) fixed to the side wall 60b, a polygon mirror 20 as an example of the rotary polygon mirror, an fθ lens 21a and a turn-back mirror 22 are fixed to a surface of the bottom plate 60a.

According to this configuration, the laser light L emitted from the laser light emitting portion 61 is deflected to a predetermined scanning direction by the polygon mirror 20 and turned back by the turn-back mirror 22 so that the laser light L can be applied through an opening portion 60c (see FIG. 3) formed in the bottom surface of the housing 60. Incidentally, a cylindrical lens 21b for transmitting the laser light L reflected on the turn-back mirror 22 as shown in FIG. 1 and a cover glass 65 for covering the opening portion 60c from below as shown in FIG. 3 are provided in the opening portion 60c.

As shown in FIG. 2, a first BD mirror 67 is provided in front of the one-end side of the turn-back mirror 22. A second BD mirror 68 is provided in a position out of the optical path in which the deflected laser light L goes toward the photosensitive drum 23. The first and second BD mirrors 67 and 68 cooperate with each other so that the laser light La in a direction corresponding to the origin of the scanning is reflected toward a BD sensor 69 (which is identical to the "detection member in this embodiment). According to this configuration, the ON/OFF timing of the laser light emitting portion 61 can be set in accordance with the timing of the BD sensor 69's detection of the laser light La so that the direction of application of the laser light L can be defined accurately.

2. Configuration for Removal of Ghost Image in Scanner Portion 17

Next, the configuration for removal of the ghost image in the scanner portion 17 will be described.

(1) Configuration

An angle α between the center of luminous flux of the laser light L toward the deflection surface 3a of the polygon mirror 3 and an optical axis C of the imaging optical systems 4 and 5 (hereinafter referred to as "incidence angle α" of the laser light L on the polygon mirror 3) is set to satisfy the following relational expression (hereinafter referred to as "relational expression A") to thereby form a ghost image in a position out of an effective scanning range (used for forming an image) of the photosensitive drum surface 6 in which the original electrostatic latent image must be formed.

$$|\alpha| < (4\pi/N) - (W/D)$$

in which N is the number of deflection surfaces of the polygon mirror 3, D is the focal length of the imaging optical system 5 (fθ lens), and W is a half width of the effective scanning range in the scanning direction.

Figure 4:
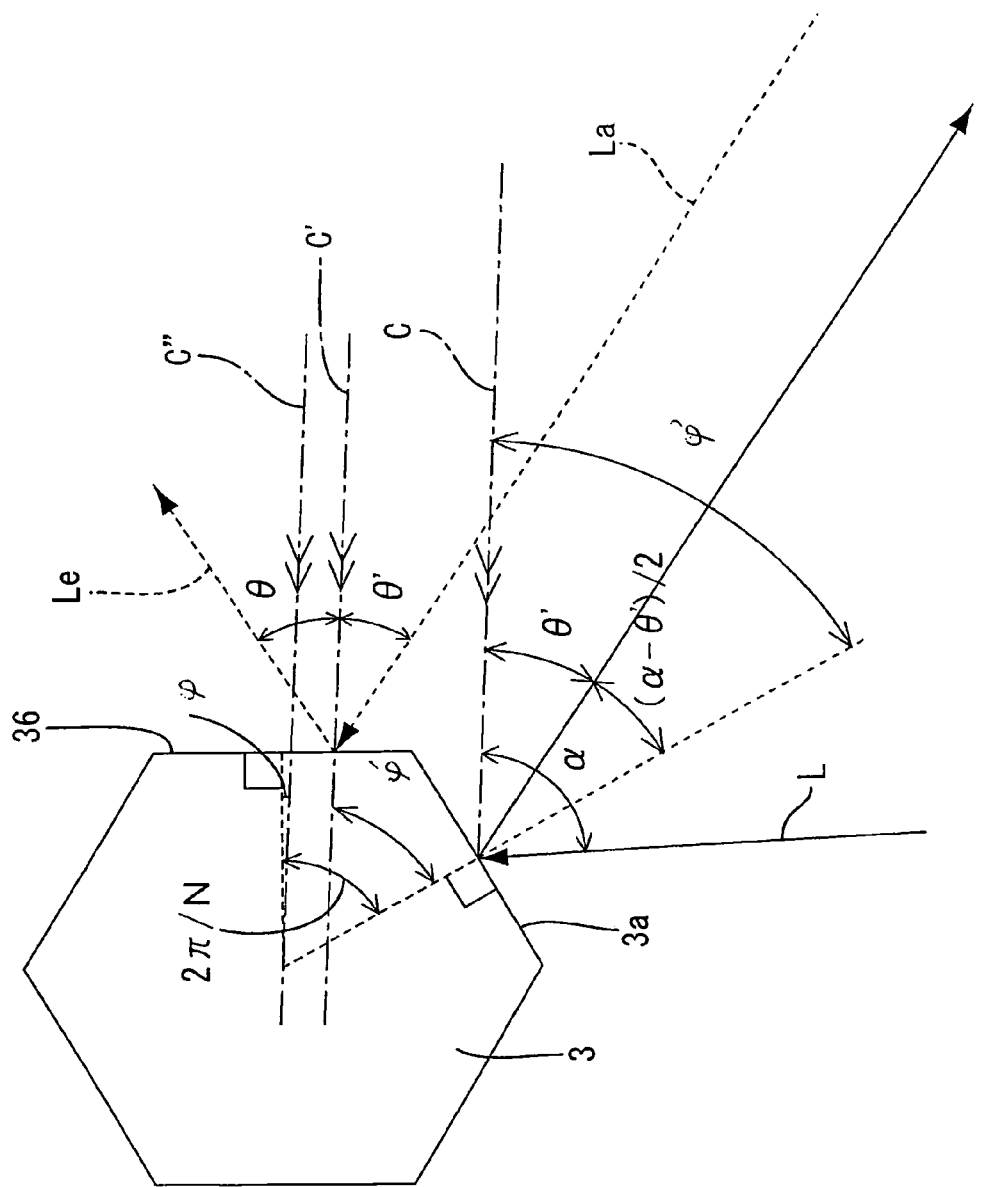
FIG. 4 is a typical view for explaining the relational expression A.
Figure 8:
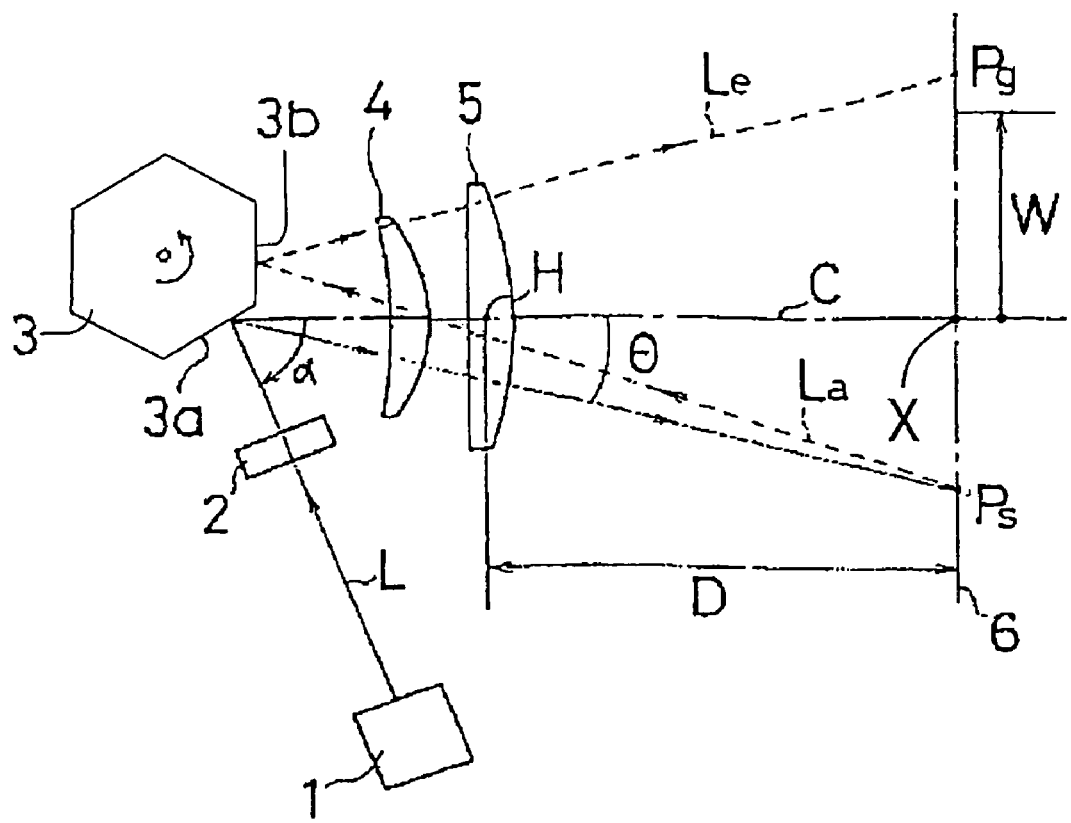
FIG. 8 is a typical view showing the configuration of a laser scanning apparatus according to a background art.

The relational expression A will be described with reference to FIGS. 4 and 8. Incidentally, the point of intersection between the optical axis C of the imaging optical systems 4 and 5 and the photosensitive drum surface 6 coincides with the center position X of the effective scanning range (having a length of 2W in the scanning direction). In FIG. 4, the one-dot chain lines C' and C" show straight lines parallel to the optical axis C of the imaging optical systems 4 and 5. In FIG. 4, the reference numeral 3 designates a polygon mirror which is equivalent to the polygon mirror 20 in this embodiment, and the reference numerals 3a and 3b designate deflection surfaces which are equivalent to the deflection surface 20a and the adjacent deflection surface 20b in this embodiment, respectively.

<Numerical Expression 1>

$$|\alpha| < (4\pi/N) - (W/D) \quad \text{Relational Expression A}$$

in which N is the number of deflection surfaces of the polygon mirror 3, D is the focal length of the imaging optical system 5 (fθ lens), and W is a half width of the effective scanning range in the scanning direction.

First, the imaging optical systems 4 and 5 have fθ characteristic, so that the imaging spot Ps formed on the photosensitive drum surface 6 on the basis of the light incident at an angle θ with respect to the optical axis C (center axis) of the imaging optical systems 4 and 5 is formed in a position far by a distance Dθ from the optical axis C. Accordingly, in order to remove the ghost image from the effective scanning range, it is necessary to satisfy the following expression.

<Numerical Expression 2>

$$W < D\theta$$

in which θ is an angle between the center of luminous flux of the reflected light Le reflected on the adjacent deflection surface 3b and the optical axis C of the imaging optical systems 4 and 5.

The condition for forming the ghost image in a position out of the effective scanning range can be calculated as follows. That is, the scatter-reflected light La on the photosensitive drum surface 6 is always incident at an angle θ' on the adjacent deflection surface 3b of the polygon mirror 3.

As shown in FIG. 4, the angle φ between a line perpendicular to the adjacent deflection surface 3b and the optical axis C of the imaging optical systems 4 and 5 can be calculated based on the following expression.

<Numerical Expression 3>

$$\phi = (2\pi/N) - \phi'$$

in which φ' is an angle between a line perpendicular to the deflection surface 3a and the optical axis C of the imaging optical systems 4 and 5.

The angle φ' can be expressed by the following expression.

<Numerical Expression 4>

$$\phi' = \theta' + (\alpha - \theta')/2 = (\alpha + \theta')/2$$

Accordingly, the angle φ can be expressed by the following expression on the basis of the numerical expressions 3 and 4.

<Numerical Expression 5>

$$\phi = (2\pi/N) - (\alpha + \theta')/2$$

Next, the angle θ is calculated. The scatter-reflected light La is incident at an angle θ'+φ on the adjacent deflection surface 3b and is reflected at the same angle θ'+φ on the adjacent deflection surface 3b. Accordingly, the relational expression θ'+θ=2(θ'+φ) holds. Accordingly, the angle θ can be expressed by the following expression.

<Numerical Expression 6>

$$\theta = \theta' + 2\phi$$

The angle θ' can be expressed by the following expression on the basis of the numerical expressions 5 and 6.

<Numerical Expression 7>

$$\theta = \theta' + (4\pi/N) - (\alpha + \theta') = (4\pi/N) - \alpha$$

Incidentally, it is apparent from this numerical expression that the angle θ does not depend on the incidence angle θ' of the scatter-reflected light La on the adjacent deflection surface 3b. That is, as described above, the reflected light Le is always concentrated on the point Pg regardless of the incidence angle θ' of the laser light L on the deflection mirror 3a of the polygon mirror 3.

When the numerical expression 7 is put in the numerical expression 2, the relational expression represented by the numerical expression 1 can be calculated. That is, when the incidence angle α of the laser light L on the polygon mirror 3 is set to be smaller than (4π/N)−(W/D), the ghost image can be removed from the effective scanning range.

(2) Configuration of this Embodiment

Next, the configuration of this embodiment will be described with reference to FIG. 5.

Figure 5:
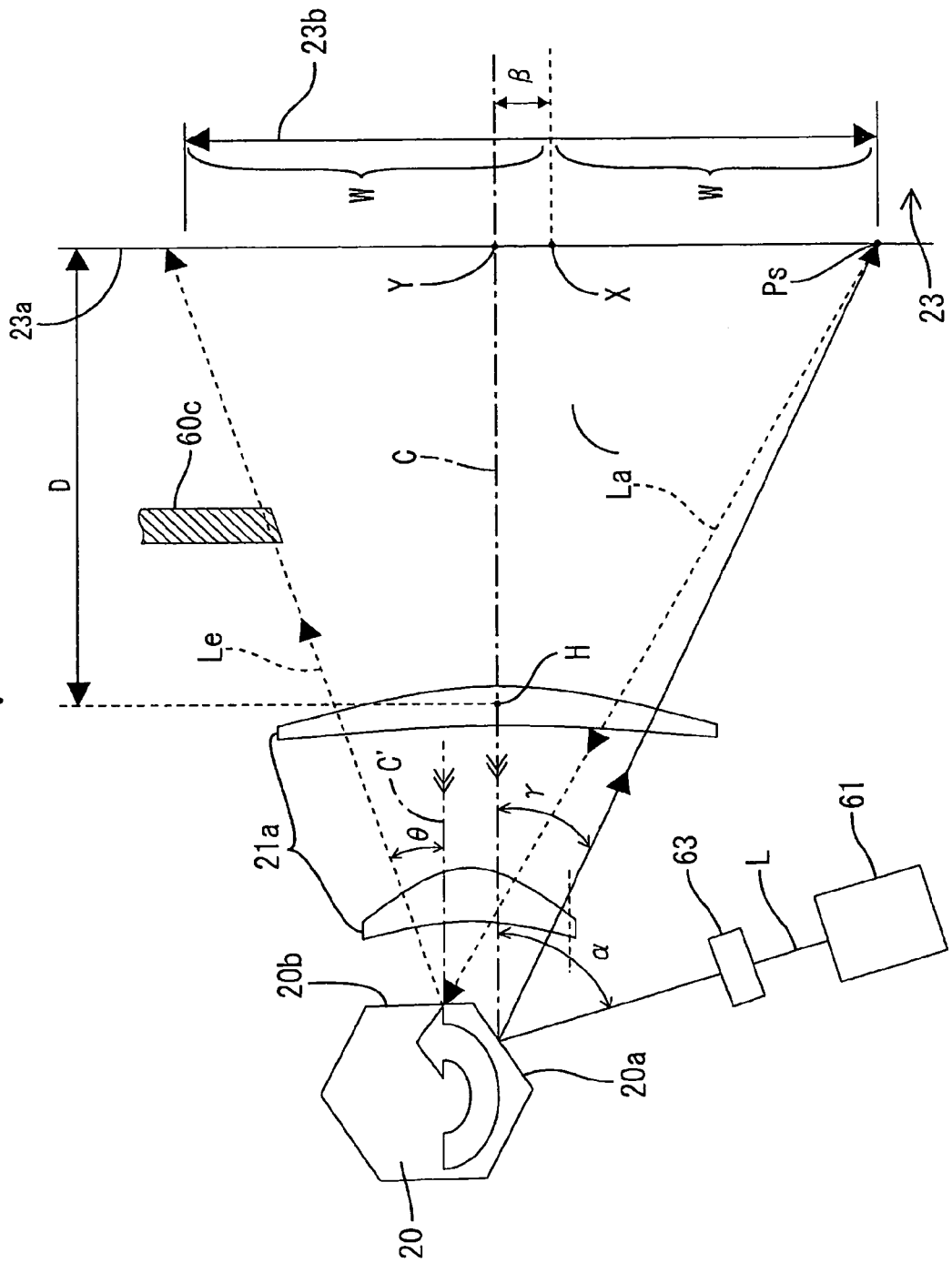
FIG. 5 is a typical view showing the configuration of the scanner portion.

In FIG. 5, the reference numeral 61 designates the laser light emitting portion; 63, the collimator lens set; and 20, the polygon mirror. The reference numeral 21a designates the fθ lens which is equivalent to the imaging optical systems 4 and 5 according to the conventional configuration, and the reference symbol D is the optical distance from a principal point H on the image side (photosensitive drum 23 side) of the fθ lens to the photosensitive drum surface 23a. The reference numeral 23a designates the surface (scanned surface) of the photosensitive drum 23, and the reference numeral 23b designates the region (having a total length of 2W in the scanning direction) of the effective scanning range on the photosensitive drum surface 23a. Incidentally, the term "effective scanning range" means a region which is part of the photosensitive drum surface 23a and which is used for forming a normal latent image corresponding to an image to be formed.

According to this configuration, laser light L (represented by the solid-line arrow in FIG. 5) emitted from the laser light emitting portion 61 is incident on a deflection surface 20a of the polygon mirror 20 through the collimator lens set 63 in the same manner as in the conventional configuration. The laser light L reflected on the deflection surface 20a is configured so that the imaging spot Ps is formed on the photosensitive drum 23a through the fθ lens 21a. The imaging spot Ps is scanned on the photosensitive drum surface 23a with the rotation of the polygon mirror 20.

In this embodiment, the effective scanning range is formed so that the center position X of the effective scanning range is displaced by a distance β toward the laser light emitting portion 61 side (downward in FIG. 5) from the point Y of intersection between the optical axis C of the fθ lens 21a and the photosensitive drum surface 23a.

According to this configuration, while the distance W equal to a half of the effective scanning range is set to be smaller than Dθ+β, the incidence angle α of the laser light L on the polygon mirror 20 can be set to satisfy the following relational expression.

<Numerical Expression 8>

$$(4\pi/N) - (W/D) \leq |\alpha| < (4\pi/N) - \{(W-\beta)/D\}$$

in which N is the number of deflection surfaces of the polygon mirror 20, D is the optical distance from the image side principal point H of the fθ lens 21a to the photosensitive drum surface 23a, and W is a half width of the effective scanning range 23b in the scanning direction.

The displacement width (distance β) between the center position X of the effective scanning range 23b and the optical axis C of the fθ lens 21a is set to be smaller than Dγ−W. Incidentally, γ is an angle between the optical axis C of the fθ lens 21a and the center of luminous flux of the laser light L passing through a position nearest to the laser light emitting portion 61 side in the effective region in which the fθ lens 21a can form an image.

In this embodiment, as shown in FIG. 5, a shading member 60c is provided between the fθ lens 21a and the photosensitive drum surface 23a so as to be interposed in the middle of the optical path of the reflected light Le reflected on the adjacent deflection surface 20b, that is, the reflected light Le by which the ghost image is formed in a region out of the effective scanning range. For example, the shading member 60c is constituted by a wall portion which is formed so as to be erected from the bottom plate 60a of the housing 60.

3. Effect of this Embodiment (1) According to this embodiment, the effective scanning range 23b of the laser light L in the scanning direction is formed so that the center position X of the effective scanning range 23b is displaced by a distance β along the scanning direction from the optical axis C of the fθ lens 21a. Accordingly, the incidence angle α between the center of luminous flux of the laser light L on the deflection surface 20a of the polygon mirror 20 and the optical axis C of the fθ lens 21a can be set to satisfy the relational expression $(4\pi/N)-(W/D) \leq |\alpha| < (4\pi/N)-\{(W-\beta)/D\}$. That is, the ghost image can be removed from the effective scanning range 23b. In addition, on the contrary to the conventional configuration, the incidence angle α can be increased without reduction in the number of deflection surfaces of the polygon mirror 20. Because the incidence angle α can be increased, the distance between the polygon mirror 20 and the fθ lens 21a can be reduced so that the size of the apparatus can be reduced.

When, for example, the number of deflection surfaces of the polygon mirror 20 is changed from 4 to 8 in the condition that the effective scanning range W is 105 mm, the optical distance D from the image side principal point H of the fθ lens 21a to the photosensitive drum surface 23a is 150 mm and the distance β is 10 mm, the incidence angle α is changed as shown in the following table. As is obvious from the table, in this embodiment, in any case where the number of deflection surfaces of the polygon mirror 20 is in a range of from 4 to 8, the incidence angle α can be set to be larger by about 3.82° than that in the conventional configuration.

TABLE 1

| Number N of Surfaces of Polygon Mirror | α[°] in the first embodiment | α[°] in the Conventional Configuration |
|---|---|---|
| 4 | 143.71 | 139.89 |
| 5 | 107.71 | 103.89 |
| 6 | 83.71 | 79.89 |
| 7 | 66.57 | 62.75 |
| 8 | 53.71 | 49.89 |

(2) If the ghost image is formed in a side portion of the effective scanning range 23b on the photosensitive drum surface 23a even though the ghost image can be removed from the effective scanning range 23b, an excessive amount of toner is spent because the toner is deposited on the ghost image. Therefore, in this embodiment, the shading member 60c is provided for shading the laser light Le reflected on the adjacent deflection surface 20b of the polygon mirror 20 and going toward a position which is part of the photosensitive drum surface 23a and which is displaced in a direction opposite to the laser light emitting portion 61 with respect to the effective scanning range 23b. Consequently, consumption of wasteful toner can be suppressed because the ghost image can be surely prevented from being formed on the photosensitive drum surface 23a.

<Embodiment 2>

Figure 6:
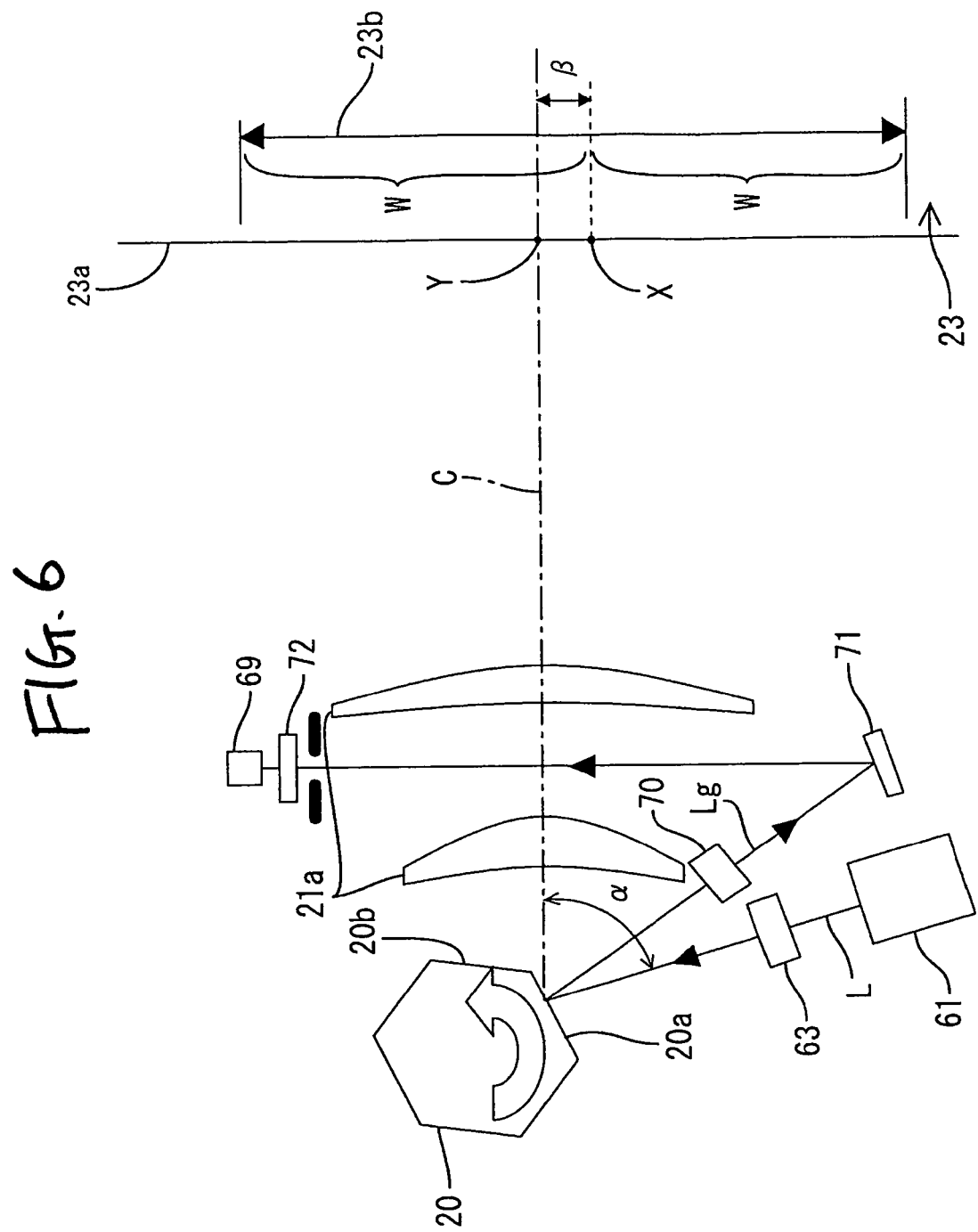
FIG. 6 is a typical view showing the configuration of the scanner portion in Embodiment 2.

FIG. 6 shows Embodiment 2. Embodiment 2 is the same as Embodiment 1 except the arrangement of the optical path of the laser light received by the BD sensor 69. Accordingly, like numerals and symbols in Embodiment 1 will be given to Embodiment 2 to avoid duplicated description. Only the point of difference will be described below.

1. Configuration of the Embodiment 2

Embodiment 1 is configured so that the laser light emitted from the laser light emitting portion 61, reflected on the deflection surface 20a of the polygon mirror 20 and transmitted through the end portion (end portion of the effective region) of the fθ lens 21a is received by the BD sensor 69 through the BD mirrors 67 and 68. On the other hand, in this embodiment, as shown in FIG. 6, the optical path of the laser light received by the BD sensor 69 is disposed between the optical path of the laser light L from the laser light emitting portion 61 and the fθ lens 21a. In other words, this embodiment is configured so that the laser light Lg which is part of the light reflected on the deflection surface 20a of the polygon mirror 20 and which is displaced toward the laser light emitting portion 61 side with respect to the fθ lens 21a is received by the BD sensor 69.

Specifically, the laser light Lg reflected on the deflection surface 20a and displaced toward the laser light emitting portion 61 side with respect to the fθ lens 21a is converged by an imaging lens 70 and reflected on a reflection mirror 71 so as to be led to the BD sensor 69 side located on an opposite side with respect to the optical axis C of the fθ lens 21a. Configuration is made so that the light is received by the BD sensor 69 through a slit plate 72 disposed in front of the BD sensor 69. Incidentally, the slit plate 72 has a role of preventing the other disturbance light than the laser light Lg from being received by the BD sensor 69.

2. Effect of this Embodiment

In the configuration as shown in Embodiment 1, there is a problem that the effective scanning range 23b is narrowed by the optical path of the laser light used by the BD sensor 69. On the contrary, in this embodiment, the incidence angle α is increased so that a space can be kept to a certain degree between the laser light emitting portion 61 and the fθ lens 21a. Accordingly, this embodiment is configured so that the laser light Lg passing through between the laser light emitting portion 61 and the fθ lens 21a is received by the BD sensor 69. Consequently, the effective region of the fθ lens 21a can be used sufficiently, so that the effective scanning range 23b on the photosensitive drum surface 23a can be kept wide. Conversely, the size of the fθ lens 21a can be reduced because it is unnecessary to keep the region for transmitting the laser light to be received by the BD sensor 69.

<Embodiment 3>

Figure 7:
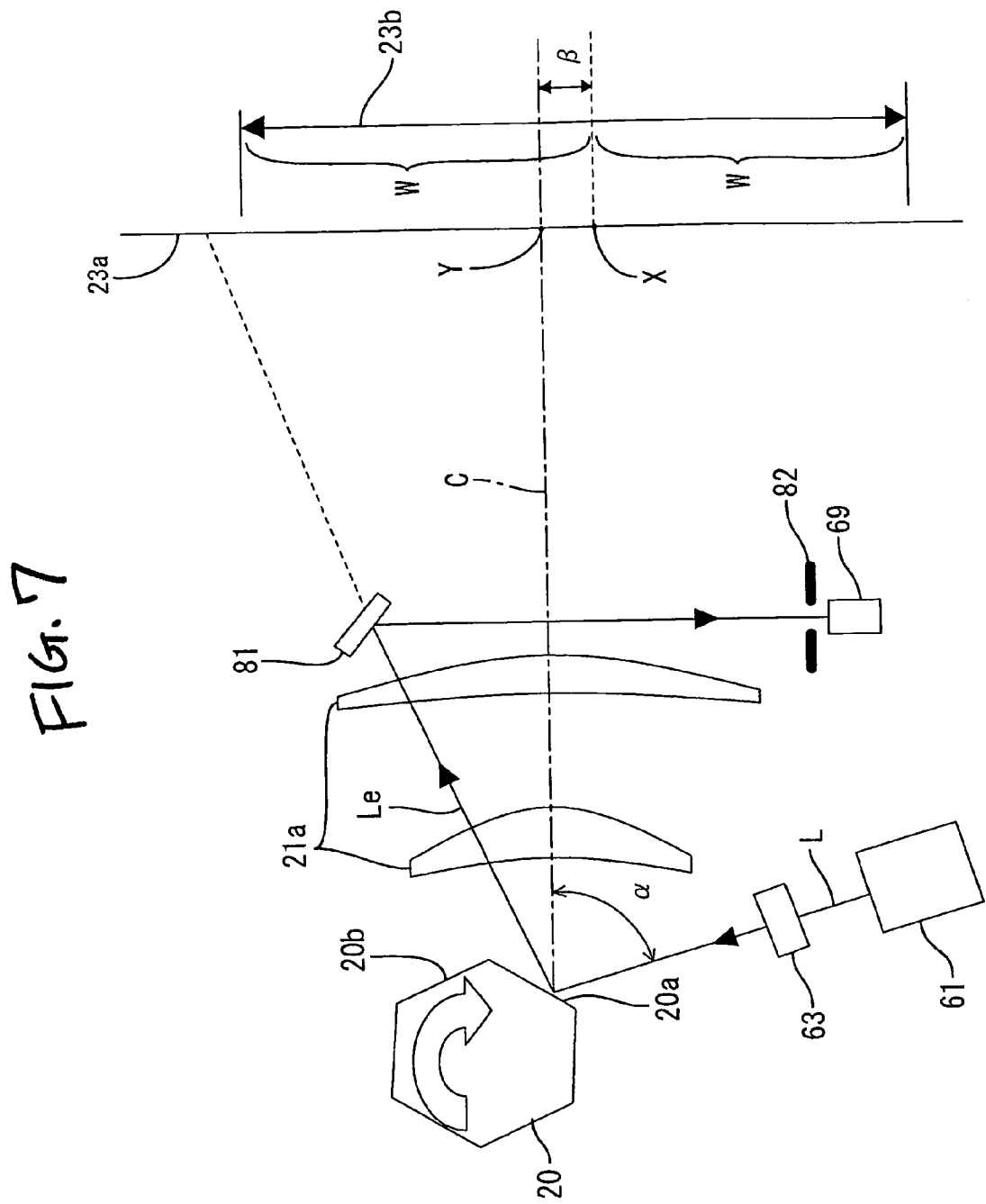
FIG. 7 is a typical view showing the configuration of the scanner portion in Embodiment 3.

FIG. 7 shows Embodiment 3. Embodiment 3 is the same as Embodiment 1 except the arrangement of the optical path of the laser light received by the BD sensor 69. Accordingly, like numerals and symbols in Embodiment 1 will be given to Embodiment 3 to avoid duplicated description. Only the point of difference will be described below.

1. Configuration of the Embodiment 3

In this embodiment, the optical path of the laser light received by the BD sensor 69 is used as the optical path of the laser light going toward a region displaced on a side opposite to the laser light emitting portion 61 with respect to the effective scanning range 23b, that is, as the optical path of the laser light Le by which the ghost image is formed on the photosensitive drum surface 23a. In other words, this embodiment is configured so that the laser light Le is received by the BD sensor 69.

Specifically, the laser light Le reflected on the deflection surface 20a or 20b and going toward a region displaced on a side opposite to the laser light emitting portion 61 with respect to the effective scanning range 23b is reflected on a reflection mirror 81 so as to be led to the BD sensor 69 side located on an opposite side with respect to the optical axis C of the fθ lens 21a. Configuration is made so that the light is received by the BD sensor 69 through a slit plate 82 disposed in front of the BD sensor 69. Incidentally, the slit plate 82 also has a role of preventing the other disturbance light than the laser light Le from being received by the BD sensor 69.

2. Effect of the Embodiment 3

According to this embodiment, the effective scanning range 23b is set so that the center position X of the effective scanning range 23b in the scanning direction is located in a position displaced toward the laser light emitting portion 61 side from the optical axis C of the fθ lens 21a. Accordingly, a space from the end portion of the photosensitive drum surface 23a on a side opposite to the laser light emitting portion 61 to the effective scanning range 23b can be kept. Therefore, the optical path of the laser light received by the BD sensor 69 is used as the optical path of the laser light Le going toward a region displaced on a side opposite to the laser light emitting portion 61 with respect to the effective scanning range 23b. Consequently, the laser light which could not be used for forming an image can be used effectively.

<Other Embodiments>

The invention is not limited to the embodiments explained on the basis of the aforementioned description and drawings. For example, the following embodiments may be included in the technical scope of the invention and other various changes may be made without departing from the gist of the invention.

(1) Although each of the aforementioned embodiments has shown the case where the invention is applied to the scanner portion 17 included in the laser printer 1, the invention is not limited to the case where the laser light is scanned as in the scanner portion 17 and the invention can be also applied to an apparatus in which the light beam is scanned if the light beam has directivity to a certain degree.

(2) The invention can be applied not only to the printer (laser printer) but also to other image-forming apparatuses such as a facsimile machine, and a combination machine having a printer function, a scanner function, etc.

What is claimed is:

1. A light beam scanning apparatus comprising:
a light source portion which emits a light beam;
a rotary polygon mirror having a plurality of deflection surfaces, which deflects the light beam incident on the plurality of deflection surfaces by rotating on a rotation axis; and
an imaging optical system which scans and images the light beam deflected by the rotary polygon mirror on a scanned surface to thereby form a latent image on the scanned surface, wherein
a position which is a center of an effective scanning range of the light beam in a scanning direction and on which the latent image is formed on the scanned surface is set to be apart from an optical axis of the imaging optical system by a distance β along the scanning direction; and
an angle α between a center of luminous flux of the light beam incident on the deflection surfaces of the rotary polygon mirror and an optical axis of the imaging optical system is set to satisfy a following relational expression to thereby form a ghost image on a region out of the effective scanning range $$(4\pi/N)-(W/D) \leq |\alpha| < (4\pi/N)-\{(W-\beta)/D\}$$

in which N is the number of deflection surfaces of the rotary polygon mirror, D is the optical length from an image-side principal point of the imaging optical system to the scanned surface, and W is a half width of the effective scanning range in the scanning direction.

2. A light beam scanning apparatus according to claim 1, wherein
the center position of the effective scanning range is displaced toward the light source portion side from the optical axis of the imaging optical system.

3. A light beam scanning apparatus according to claim 1, wherein
the distance β is set to satisfy the following relational expression $$\beta < D\gamma - W$$

in which γ is an angle between the optical axis of the imaging optical system and the center of luminous flux of the light beam passing through a position nearest to the light source portion side, in an effective region on which the imaging optical system can form an image.

4. A light beam scanning apparatus according to claim 1, wherein
a shading member is provided between the imaging optical system and the scanned surface so that the light beam is shaded from an optical path of the light beam by which the ghost image is formed on a region out of the effective scanning range.

5. A light beam scanning apparatus according to claim 1, wherein
a detection member is provided for receiving the light beam reflected on the deflection surfaces of the rotary polygon mirror and correcting the timing of emitting the light beam from the light source portion on the basis of the timing of light reception; and
an optical path of the light beam received by the detection member is disposed between the optical path of the light beam from the light source portion and the imaging optical system.

6. A light beam scanning apparatus according to claim 1, wherein
the center position of the effective scanning range is displaced toward the light source portion side from the optical axis of the imaging optical system,
a detection member is provided for receiving the light beam reflected on the deflection surfaces of the rotary polygon mirror and correcting the timing of emitting the light beam from the light source portion on the basis of the timing of light reception, and an optical path of the light beam received by the detection member is provided as an optical path of the light beam going toward a region displaced on a side opposite to the light source portion with respect to the effective scanning range.

7. An image-forming apparatus comprising:

a light beam scanning apparatus according to claim 1;

an image carrier having the scanned surface on which the latent image is formed on the basis of the light beam given from the light beam scanning apparatus;

a developing member which deposits a developing agent on the image carrier having the latent image thereon; and a transfer member which transfers the developing agent deposited on the image carrier by the developing member, onto a recording medium to form an image.

* * * * *